No. 820,395. PATENTED MAY 15, 1906.
J. C. DAMERON.
BARBED FENCE WIRE.
APPLICATION FILED FEB. 27, 1906.

WITNESSES:

John C. Dameron,
INVENTOR

By
ATTORNEYS

UNITED STATES PATENT OFFICE.

JOHN CLEVELAND DAMERON, OF WESTON, ILLINOIS.

BARBED FENCE-WIRE.

No. 820,395.　　　　　Specification of Letters Patent.　　　　　Patented May 15, 1906.

Application filed February 27, 1906. Serial No. 303,239.

*To all whom it may concern:*

Be it known that I, JOHN CLEVELAND DAMERON, a citizen of the United States, residing at Weston, in the county of McLean and State of Illinois, have invented a new and useful Barbed Fence-Wire, of which the following is a specification.

This invention relates to barbed wires for fences, and has for its objects to improve the construction and increase the efficiency and utility of devices of this character.

Another object of the invention is to produce a simply-constructed device of this character which will not injure animals who may come in contact therewith, while at the same time effectually preventing the passage of the animals.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1:
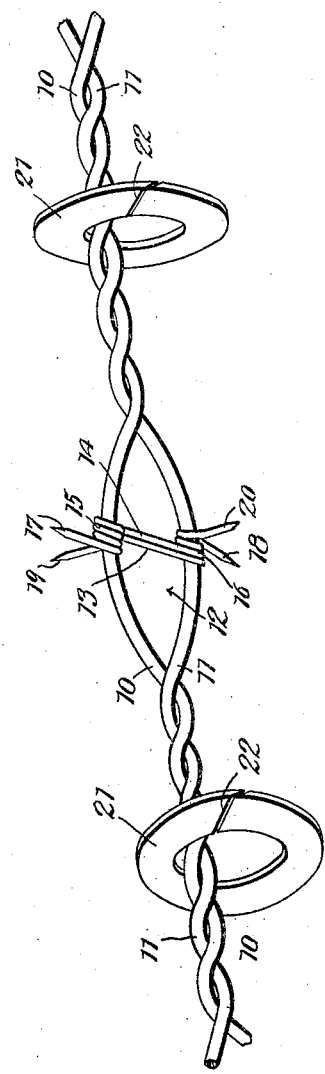
Figure 2:
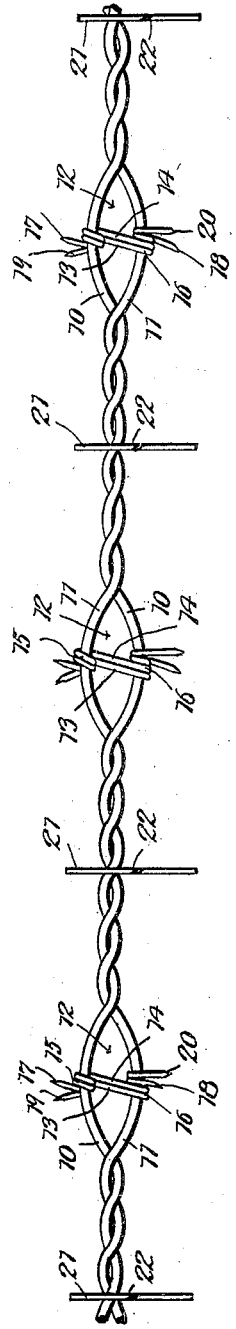

Figure 1 is a perspective view of a portion of one of the strand-wires of a fence embodying the improved construction. Fig. 2 is a side elevation on a smaller scale of a longer section of one of the improved strand-wires.

The improved device comprises two strand-wires 10 11, entwisted at intervals and the wires separated between the twisted portions to form loops 12. The barb portion of the improved device consists of wires 13 14, arranged in pairs and disposed transversely of the loops 12 and together coiled at 15 16 around the strand-wires forming the sides of the loops and with the pointed terminals distended in opposite directions, as at 17 18 and 19 20. The barb-wires are thus interlocked at the coils and an effectual four-point barb thereby produced.

Slidably disposed upon the double strand-wires between the eyes 12 and their connected barbs are rings 21, preferably of flat metal, and each ring split or cleft at 22 to provide ready means for placing upon and removing from the strand-wires. The apertures through the rings are considerably larger than the two-part strand-wire, so that the rings will freely move longitudinally of the same, but will be checked in their movement when they bear against the barbs. Each ring is thus limited in its movement by the barbs between which it is disposed and are large enough to shield the barbs when disposed against them.

As is well known, animals are injured by the barbs upon wire fences only when they approach the fence at an angle thereto and thus "rake" the fence longitudinally, and when the animals approach a fence constructed as herein shown and described they bear against the rings 21 and carry them along the wires until the next barb is encountered, when the rings will be stopped thereby, and at the same time the barbs covered or shielded so that they cannot injure the animal. When animals approach at right angles to the fence, the barbs repel them in the ordinary manner; but animals are not seriously injured by the barbs unless they become entangled in the wires or rake them longitudinally, and the construction herein disclosed effectually protects the animals under such conditions, as before stated.

Having thus described the invention, what is claimed is—

1. In a barb-wire for fences, two strand-wires entwisted at intervals and with the wires spaced apart between the entwisted portions, and barb-wires pointed at the ends and disposed in pairs and coiled together near the ends around said separated strand-wires with their terminals extending in opposite directions.

2. In a barb-wire for fences, two strand-wires entwisted at intervals and with the wires spaced apart between the entwisted portions, barb-wires pointed at the ends and disposed in pairs and coiled together near the ends around said separated strand-wires with their terminals extending in opposite directions, and rings slidable upon said strand-wires between said barbs.

In testimony that I claim the foregoing as my own, I have hereto affixed my signature in the presence of two witnesses.

JOHN CLEVELAND DAMERON.

Witnesses:
F. M. BUSLEY,
TONIE W. SMITH.